United States Patent
Liu et al.

(10) Patent No.: US 8,370,815 B2
(45) Date of Patent: Feb. 5, 2013

(54) ELECTRONIC DEVICE AND METHOD FOR DEBUGGING PROGRAMS

(75) Inventors: Xiao-Mei Liu, Shenzhen (CN); Guang-Jian Wang, Shenzhen (CN); Jin-Rong Zhao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/286,086

(22) Filed: Oct. 31, 2011

(65) Prior Publication Data

US 2012/0266028 A1     Oct. 18, 2012

(30) Foreign Application Priority Data

Apr. 13, 2011   (CN) .......................... 2011 1 0092111

(51) Int. Cl.
*G06F 9/44* (2006.01)
*G06F 11/00* (2006.01)

(52) U.S. Cl. .......... 717/128; 717/124; 714/38.1; 714/48
(58) Field of Classification Search .................. 717/124, 717/128; 714/38.1, 48
See application file for complete search history.

(56) References Cited

U.S. PATENT DOCUMENTS

| | | | |
|---|---|---|---|
| 6,349,355 B1 * | 2/2002 | Draves et al. ...................... | 711/6 |
| 6,675,218 B1 * | 1/2004 | Mahler et al. .................. | 709/230 |
| 7,080,172 B1 * | 7/2006 | Schmalz ........................ | 710/104 |
| 7,293,142 B1 * | 11/2007 | Xu et al. ........................ | 711/124 |
| 7,487,321 B2 * | 2/2009 | Muthiah et al. ............... | 711/170 |
| 7,669,030 B2 * | 2/2010 | Chittigala ...................... | 711/170 |
| 7,870,541 B1 * | 1/2011 | Deshpande .................... | 717/131 |
| 7,904,278 B2 * | 3/2011 | Wilson et al. ................. | 702/186 |
| 7,930,491 B1 * | 4/2011 | Xu et al. ........................ | 711/154 |
| 2005/0235127 A1 * | 10/2005 | Muthiah et al. ............... | 711/170 |
| 2006/0212852 A1 * | 9/2006 | Hwang ......................... | 717/127 |
| 2009/0013145 A1 * | 1/2009 | Chittigala ...................... | 711/170 |
| 2010/0115273 A1 * | 5/2010 | Chittigala ...................... | 713/164 |
| 2011/0161944 A1 * | 6/2011 | Cho et al. ...................... | 717/149 |
| 2012/0266028 A1 * | 10/2012 | Liu et al. ......................... | 714/42 |

OTHER PUBLICATIONS

Jeong et al. "KAL: Kernel-assisted Non-invasive Memory Leak Tolerance with a General-purpose Memory Allocator", Softw. Pract. Exper. 2000; 00:1-7, retrieved from <http://csl.skku.edu/papers/spe10.pdf> total pp. 28.*
Corbet, "Detecting kernel memory leaks" Jun. 19, 2006, retrieved from <http://lwn.net/Articles/187979/>, total pp. 5.*
Robert Love, "Kernel Korner—Allocating Memory in the Kernel", Dec. 1, 2003, Retrieved from <http://www.linuxjournal.com/article/6930?page=0,0>, total pp. 9.*

* cited by examiner

*Primary Examiner* — Don Wong
*Assistant Examiner* — Marina Lee
(74) *Attorney, Agent, or Firm* — Altis Law Group, Inc.

(57) ABSTRACT

In a method for debugging programs of an electronic device, the method adds an appended block to one or more memory blocks allocated by one or more memory allocation functions of a specified program, so as to obtain one or more appended blocks, stores an identifier of each memory allocation function into a corresponding appended block, and executes a memory leak test to determine one or more unqualified memory allocation functions. The method further searches for one or more identifiers from the appended blocks if the memory leak test fails, and obtains a position of each unqualified memory allocation function in the specified program according to each found identifier if source codes of the specified program are available in a storage device of the electronic device.

16 Claims, 4 Drawing Sheets

ELECTRONIC DEVICE AND METHOD FOR DEBUGGING PROGRAMS

BACKGROUND

1. Technical Field

Embodiments of the present disclosure relate to test technology, and particularly to an electronic device and method for debugging programs of the electronic device.

2. Description of Related Art

A memory leak occurs when a computer program consumes memory but is unable to release it back to the operating system, which results in a reduction of memory storage space. Many debugging and tracing tools (e.g. the LeakTracer tool) can be used to detect the memory leak occurring in many computer programs. However, the current debugging and tracing tools cannot detect the memory leak occurring in a kernel routine program or a driver program which belongs to the kernel codes of an operating system of a computing device. Therefore, a more efficient method for debugging programs of an electronic device is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
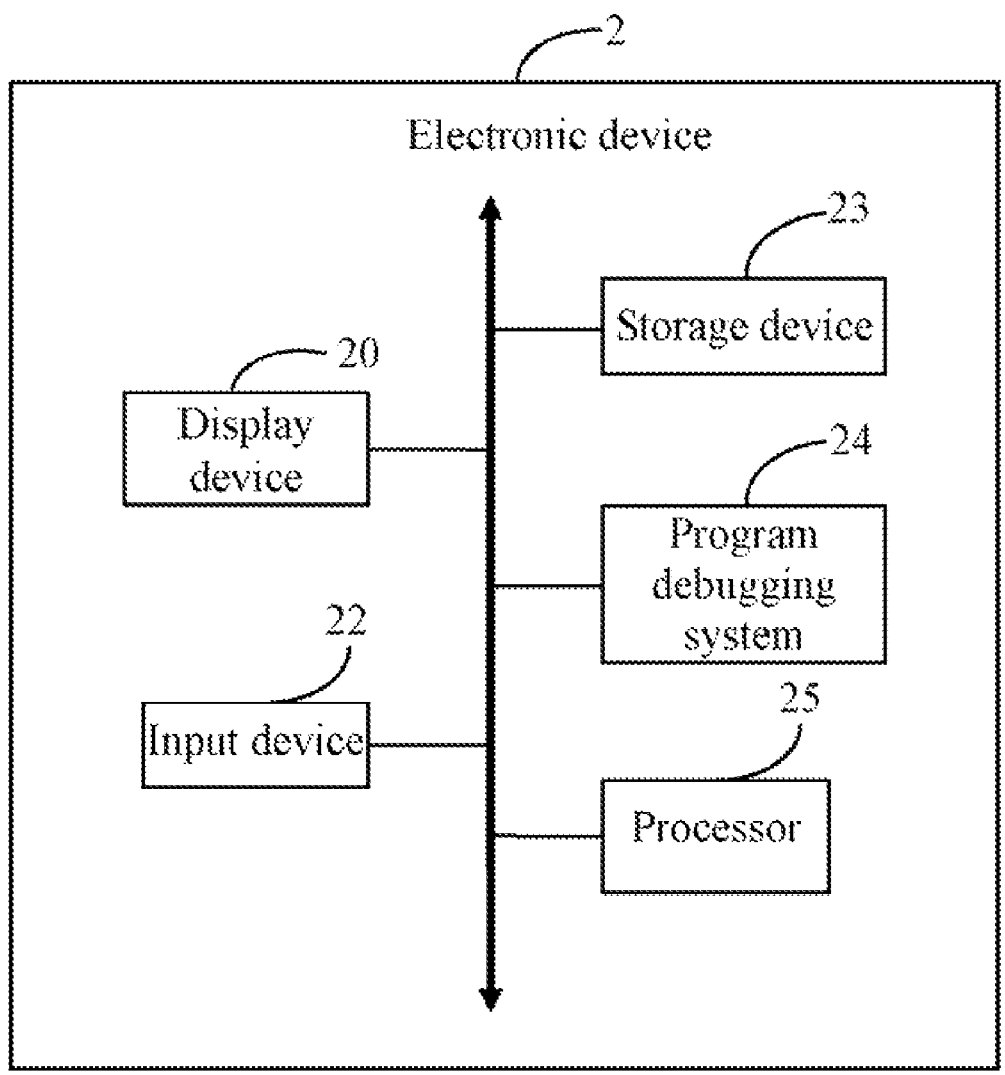
FIG. 1 is a block diagram of one embodiment of an electronic device including a program debugging system.

FIG. 1 is a block diagram of one embodiment of an electronic device 2 including a program debugging system 24. In the embodiment, the electronic device 2 further includes a display device 20, an input device 22, a storage device 23, and at least one processor 25. The electronic device 2 may be a computer, a server, or any other computing device. The program debugging module 24 is used to determine whether a memory leak occurs in a specified application program ("the specified program") of an operating system (OS) of the electronic device 2, and further to locate a position of the memory leak. A detailed description will be given in the following paragraphs.

The display device 20 is used to display debugging results of the specified program, and the input device 22 may be a mouse, a keyboard, touchscreen, and/or a touchpad used to input computer readable data. In one embodiment, the specified program may be a kernel routine program or a driver program.

Figure 2:
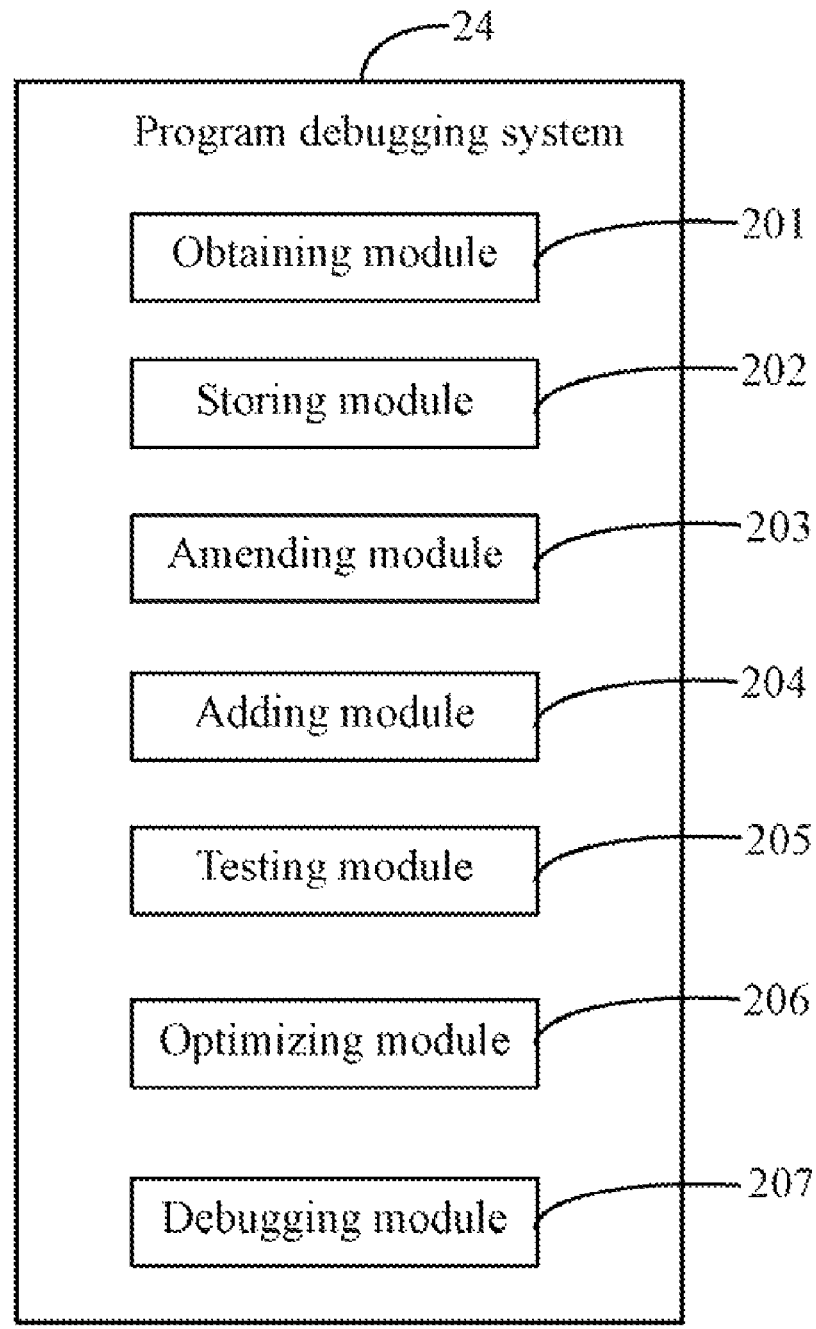
FIG. 2 is a block diagram of function modules of the program debugging system included in the electronic device of FIG. 1.

FIG. 2 is a block diagram of function modules of the program debugging module 24 included in the electronic device 2. In one embodiment, the program debugging module 24 may include one or more modules, for example, an obtaining module 201, a storing module 202, an amending module 203, an adding module 204, a test module 205, an optimizing module 206, and a debugging module 207. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives. The one or more modules 201-207 may comprise computerized code in the form of one or more programs that are stored in the storage device 23 (or memory). The computerized code includes instructions that are executed by the at least one processor 25 to provide functions for the one or more modules 201-207.

Figure 3:
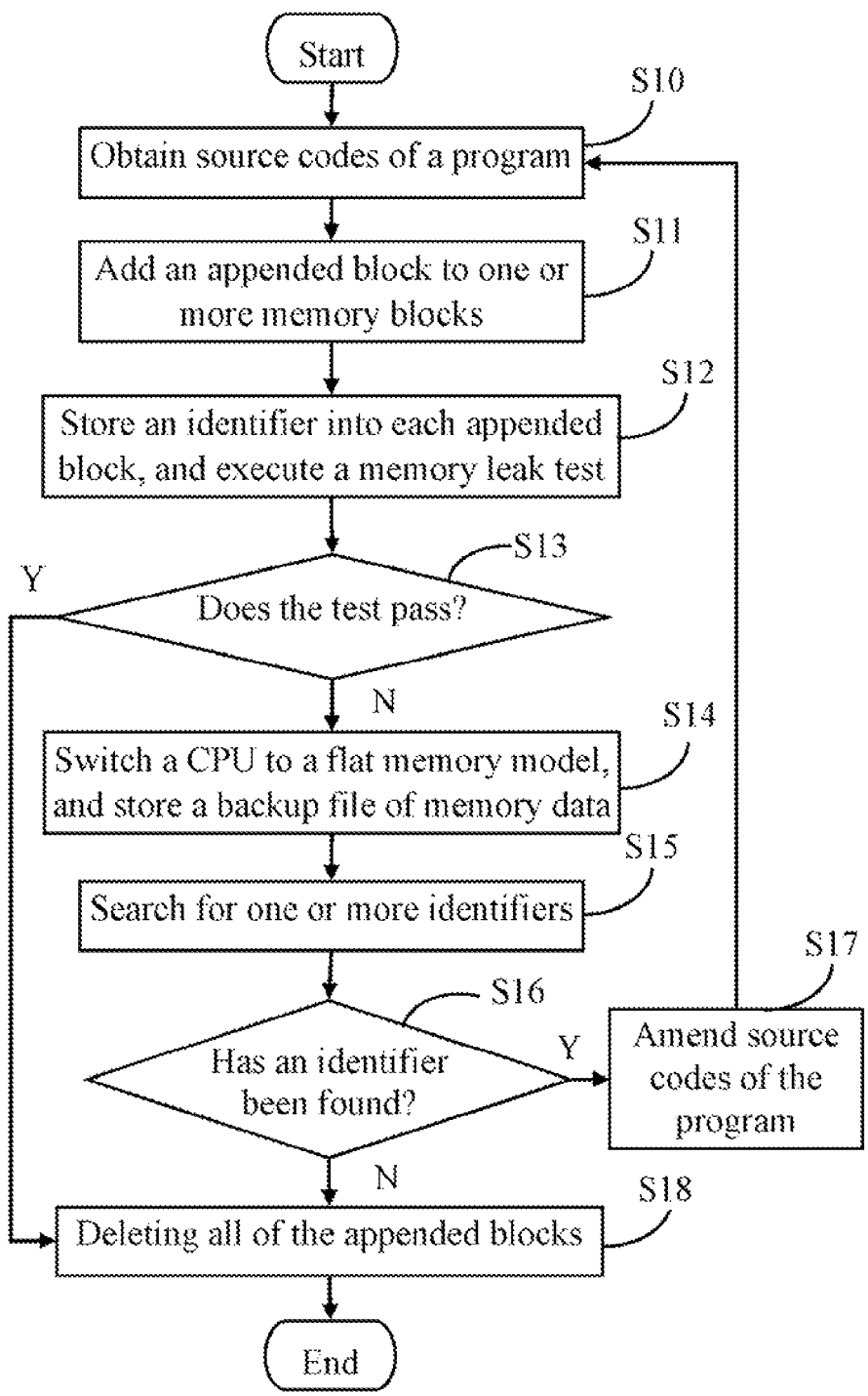
FIG. 3 is a flowchart of a first embodiment of a method for debugging programs using the electronic device of the FIG. 1.

FIG. 3 is a flowchart of a first embodiment of a method for debugging programs using the electronic device 2. In the first embodiment, source codes of the specified program are available in the storage device 23 of the electronic device 2.

Depending on the embodiment, additional blocks may be added, others removed, and the ordering of the blocks may be changed.

In block S10, the obtaining module 201 obtains the source codes of the specified program from the storage device 23, and replaces one or more memory allocation functions in the source codes of the specified program with a user-defined function.

For example, if the OS installed in the electronic device 2 is a WINDOWS system, the replacement may be defined using a first code expression such as: #define malloc(x) mallocl(x). In the first code expression, "malloc(x)" represents a memory allocation function in the source codes of the specified program, and "mallocl(x)" represents the user-defined function corresponding to and replacing "malloc(x)".

If the OS installed in the electronic device 2 is a LINUX system, the replacement may be defined using a second code expression: #define kmalloc(size, GFP_ATOMIC) kmalloc__1((size), GFP_ATOMIC). In the second code expression, "kmalloc( )" represents a memory allocation function in the source codes of the specified program, and "kmalloc__1( )" represents the user-defined function corresponding to and replacing "kmalloc( )".

In block S11, if a memory block is allocated by each memory allocation function of the specified program, the adding module 204 adds an appended block to the memory block using the user-defined function, so as to obtain one or more appended blocks in a memory (e.g., the storage device 23) of the electronic device 2. In one embodiment, the appended block is appended to a head or an end of the memory block.

For example, if the OS installed in the electronic device 2 is the WINDOWS system, the appended block may be added to the memory block using a third code expression: #define mallocl(x) memset(malloc((x+y)),'GUID',x+y). In the third code expression, "x" represents a size of a memory block allocated by a memory allocation function in the source codes of the specified program, and "y" represents a size of an appended block added by the user-defined function corresponding to the memory block "x".

For example, if the OS installed in the electronic device 2 is the LINUX system, the appended block may be added to the memory block using a fourth code expression: #define kmalloc_1 (x0, GFP_ATOMIC) memset (kmalloc ((x0+y0), GFP_ATOMIC), 'GUID', (x0 +y0)). In the fourth code expression, "x0" represents a size of a memory block allocated by a memory allocation function in the source codes of the specified program, and "y0" represents a size of an appended block added by the user-defined function corresponding to the memory block "x0".

In block S12, the adding module 204 stores an identifier of each memory allocation function into an appended block corresponding to the memory block. Then, the testing module 205 recompiles the source codes of the specified program, and executes a memory leak test of the specified program to determine one or more unqualified memory allocation functions in the specified program. In one embodiment, the identifier of the memory allocation function is a globally unique identifier (GUID) used to identify each of the memory allocation functions. The memory leak test may be a stress test method used to determine whether a memory leak occurs in the memory of the electronic device 2.

In block S13, the testing module 205 determines whether the specified program passes the memory leak test. If no memory leak occurs in the specified program during the memory leak test, the testing module 205 determines that the specified program passes the memory leak test, and the procedure goes to block S18. If one or more memory leaks occur in the specified program during the memory leak test, the testing module 205 determines that the specified program fails the memory leak test, and the procedure goes to block S14.

In block S14, the optimizing module 206 switches the processor 25 (e.g., a central processing unit (CPU) of the electronic device 2) to a flat memory model, and/or stores a backup file of the memory data of the electronic device 2 into the storage device 23 when the memory leak test is complete. For example, if the OS installed in the electronic device 2 is the UNIX system, the backup file of the memory data may be obtained using a fifth code expression: dump [-0123456789acLnSu] [-B records] [-b block size] [-C cache size] [-D dump dates] [-d density] [-f file|-P pipe command] [-h level] [-s feet] [-T date] [file system].

In block S15, the debugging module 207 searches for one or more identifiers from appended blocks of the memory of the electronic device 2 or from the backup file. It should be understood that, the block S14 may be removed in other embodiments, so that the debugging module 207 searches for the identifiers from the appended blocks of the memory of the electronic device 2. If block S14 is executed, a search speed of the identifiers is faster because the debugging module 207 can search for the identifiers from the backup file directly.

In block S16, the debugging module 207 determines if any identifier has been found. If one or more identifiers have been found, the procedure goes to block S17. If no identifier has been found, the procedure goes to block S18.

In block S17, the debugging module 207 obtains a position of each unqualified memory allocation function in the specified program according to each found identifier of the unqualified memory allocation function. For example, the debugging module 207 highlights each unqualified memory allocation function in the specified program in red, so that a user can amend the source codes of the specified program easily. After amending the source codes of the specified program, the procedure returns to block S10 to restart the memory leak test. In one embodiment, the amendment may include adding a free-memory function to delete the memory block allocated by each unqualified memory allocation function or by adjusting a position of a free-memory function to correspond to each unqualified memory allocation function.

In block S18, the debugging module 207 deletes all of the appended blocks, and recompiles the source codes of the specified program before releasing the specified program.

Figure 4:
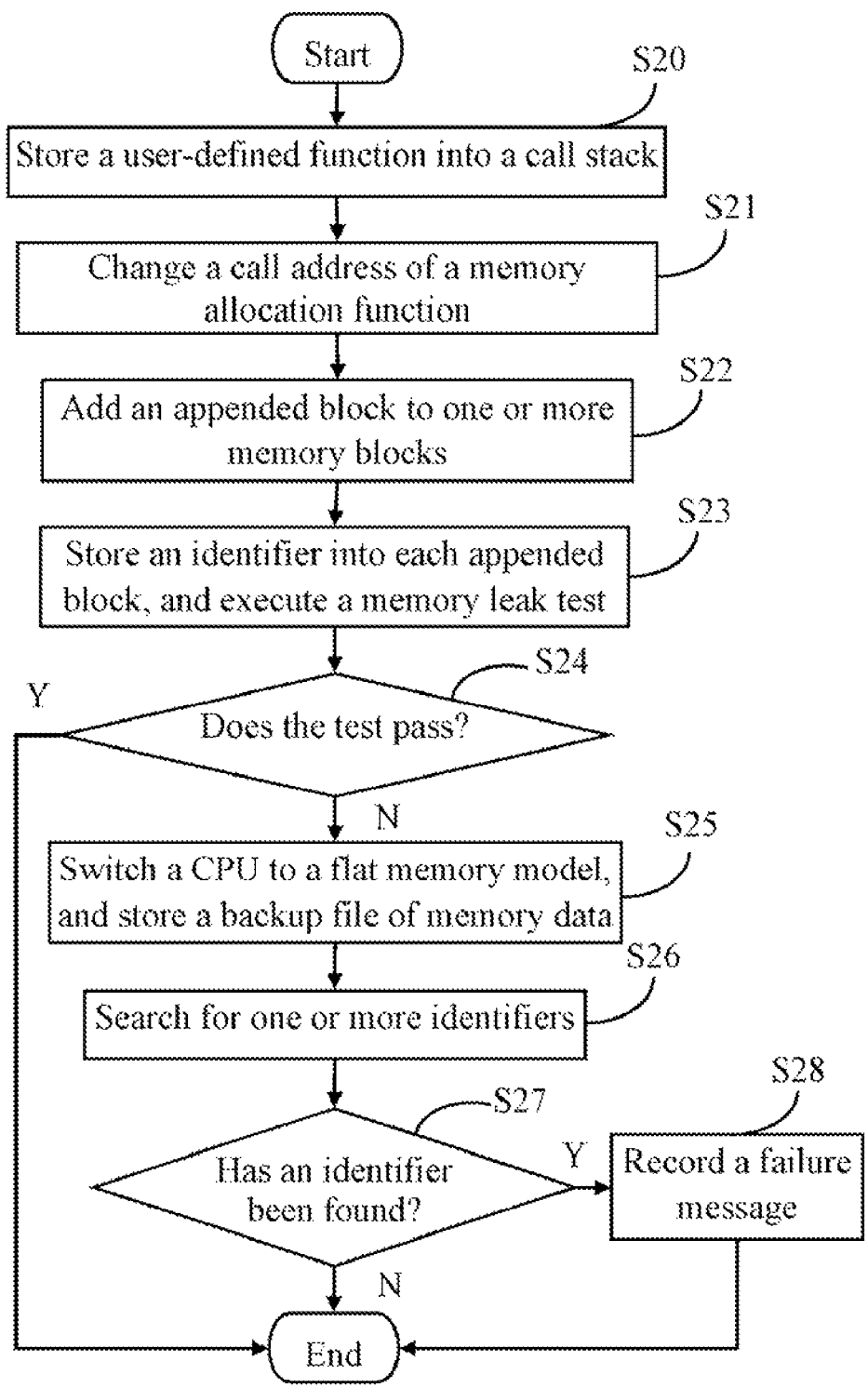
FIG. 4 is a flowchart of a second embodiment of a method for debugging programs using the electronic device of the FIG. 1.

FIG. 4 is a flowchart of a second embodiment of a method for debugging programs using the electronic device 2. In the second embodiment, the source codes of the specified program are unavailable in the storage device 23 of the electronic device 2. Depending on the embodiment, additional blocks may be added, others removed, and the ordering of the blocks may be changed.

In block S20, the storing module 202 stores the user-defined function into a call stack, so that the user-defined function can replace the memory allocation functions in the source codes of the specified program when the memory block is allocated.

In block S21, the amending module 203 changes a call address of a memory allocation function to an address of the user-defined function in the call stack if the memory allocation function performs a memory allocation operation.

In block S22, if a memory block is allocated by each memory allocation function of the specified program, the adding module 204 adds an appended block to the memory block using the user-defined function, so as to obtain one or more appended blocks in the memory of the electronic device 2.

In block S23, the adding module 204 stores an identifier of each memory allocation function into an appended block corresponding to the memory block. Then, the testing module 205 executes a memory leak test of the specified program to determine one or more unqualified memory allocation functions in the specified program.

In block S24, the testing module 205 determines whether the specified program passes the memory leak test. If no memory leak occurs in the specified program during the memory leak test, the testing module 205 determines that the specified program passes the memory leak test, and the procedure ends. If one or more memory leaks occur in the specified program during the memory leak test, the testing module 205 determines that the specified program fails the memory leak test, and the procedure goes to block S25.

In block S25, the optimizing module 206 switches the processor 25 (e.g., a central processing unit (CPU) of the electronic device 2) to a flat memory model, and/or stores a backup file of the memory data of the electronic device 2 into the storage device 23 when the memory leak test is complete.

In block S26, the debugging module 207 searches for one or more identifiers from the appended blocks of the memory of the electronic device 2 or from the backup file. As mentioned above, the block S25 may not be required in other embodiments, so that the debugging module 207 searches for the identifiers from the appended blocks of the memory of the electronic device 2.

In block S27, the debugging module 207 determines if any identifier has been found. If one or more identifiers have been found, the procedure goes to block S28. If no identifier has been found, the procedure ends.

In block S28, the debugging module 207 records a message as to the failure of the specified program (failure message) in the storage device 23 or displays the failure message on the display device 20, and sends the failure message to an owner of the source codes of the specified program.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for performing program debugging using an electronic device, the method comprising:

adding an appended block to one or more memory blocks of a specified application program using a user-defined function upon a condition that the memory blocks are allocated by one or more memory allocation functions of the specified application program, so as to obtain one or more appended blocks in a memory of the electronic device, wherein the specified application program is a kernel routine program or a driver program in an operating system of the electronic device;

storing an identifier of each memory allocation function into an appended block corresponding to the one or more memory blocks, and executing a memory leak test of the specified application program to determine one or more unqualified memory allocation functions in the specified application program;

searching for one or more identifiers from the appended blocks upon the condition that the specified application program fails the memory leak test;

obtaining a position of each unqualified memory allocation function in the specified application program according to each found identifier of the unqualified memory allocation function upon the condition that source codes of the specified application program are available in a storage device of the electronic device;

obtaining the source codes of the specified application program from the storage device upon the condition that source codes of the specified application program are available, and replacing the memory allocation functions in the source codes of the specified application program with the user-defined function, so as to add the appended block to the memory block using the user-defined function; and recording a failure message of the specified application program in the storage device upon the condition that at least one identifier has been found in the memory and the source codes of the specified application program are unavailable in the storage device.

2. The method according to claim 1, further comprising:

storing the user-defined function into a call stack upon the condition that source codes of the specified application program are unavailable, and changing a call address of a memory allocation function to an address of the user-defined function in the call stack upon the condition that the memory allocation function performs memory allocation, so as to add the appended block to the memory block using the user-defined function.

3. The method according to claim 2, wherein the identifier of the memory allocation function is a globally unique identifier (GUID) used to identify the memory allocation function.

4. The method according to claim 2, wherein the appended block is appended to a head or an end of the memory block.

5. The method according to claim 2, further comprising:

switching a processor of the electronic device to a flat memory model, and storing a backup file of memory data of the electronic device into the storage device upon the condition that the memory leak test is complete.

6. An electronic device, comprising:

a storage device;

at least one processor; and one or more modules that are stored in the storage device and are executed by the at least one processor, the one or more modules comprising instructions: to add an appended block to one or more memory blocks of a specified application program using a user-defined function upon a condition that the memory blocks are allocated by one or more memory allocation functions of the specified application program, so as to obtain one or more appended blocks in a memory of the electronic device, wherein the specified application program is a kernel routine program or a driver program in an operating system of the electronic device;

to store an identifier of each memory allocation function into an appended block corresponding to the one or more memory blocks, and execute a memory leak test of the specified application program to determine one or more unqualified memory allocation functions in the specified application program;

to search for one or more identifiers from the appended blocks upon the condition that the specified application program fails the memory leak test;

to obtain a position of each unqualified memory allocation function in the specified application program according to each found identifier of the unqualified memory allocation function upon the condition that source codes of the specified application program are available in a storage device of the electronic device;

to obtain the source codes of the specified application program from the storage device upon the condition that source codes of the specified application program are available, and replace the memory allocation functions in the source codes of the specified application program with the user-defined function, so as to add the appended block to the memory block using the user-defined function; and to record a failure message of the specified application program in the storage device upon the condition that at least one identifier has been found in the memory and the source codes of the specified application program are unavailable in the storage device.

7. The electronic device according to claim 6, wherein the one or more modules further comprise instructions:

to store the user-defined function into a call stack upon the condition that source codes of the specified application program are unavailable, and change a call address of a memory allocation function to an address of the user-defined function in the call stack upon the condition that the memory allocation function performs memory allocation, so as to add the appended block to the memory block using the user-defined function.

8. The electronic device according to claim 7, wherein the identifier of the memory allocation function is a globally unique identifier (GUID) used to identify the memory allocation function.

9. The electronic device according to claim 7, wherein the appended block is appended to a head or an end of the memory block.

10. The electronic device according to claim 7, wherein the one or more modules further comprise instructions: to switch the processor to a fiat memory model, and store a backup file of memory data of the electronic device into the storage device upon the condition that the memory leak test is complete.

11. A non-transitory storage medium having stored thereon instructions that, when executed by a processor of an electronic device, causes the electronic device to perform a method for debugging a specified application program, the method comprising:

adding an appended block to one or more memory blocks of the specified application program using a user-defined function upon a condition that the memory blocks are allocated by one or more memory allocation functions of the specified application program, so as to obtain one or more appended blocks in a memory of the electronic device, wherein the specified application program is a kernel routine program or a driver program in an operating system of the electronic device;

storing an identifier of each memory allocation function into an appended block corresponding to the one or more memory blocks, and executing a memory leak test of the specified application program to determine one or more unqualified memory allocation functions in the specified application program;

searching for one or more identifiers from the appended blocks upon the condition that the specified application program fails the memory leak test;

obtaining a position of each unqualified memory allocation function in the specified application program according to each found identifier of the unqualified memory allocation function upon the condition that source codes of the specified application program are available in a storage device of the electronic device;

obtaining the source codes of the specified application program from the storage device upon the condition that source codes of the specified application program are available, and replacing the memory allocation functions in the source codes of the specified application program with the user-defined function, so as to add the appended block to the memory block using the user-defined function; and recording a failure message of the specified application program in the storage device upon the condition that at least one identifier has been found in the memory and the source codes of the specified application program are unavailable in the storage device.

12. The non-transitory storage medium according to claim 11, wherein the method further comprises:

storing the user-defined function into a call stack upon the condition that source codes of the specified application program are unavailable, and changing a call address of a memory allocation function to an address of the user-defined function in the call stack upon the condition that the memory allocation function performs memory allocation, so as to add the appended block to the memory block using the user-defined function.

13. The non-transitory storage medium according to claim 12, wherein the identifier of the memory allocation function is a globally unique identifier (GUID) used to identify the memory allocation function.

14. The non-transitory storage medium according to claim 12, wherein the appended block is appended to a head or an end of the memory block.

15. The non-transitory storage medium according to claim 12, wherein the method further comprises steps of: switching a processor of the electronic device to a flat memory model, and storing a backup file of memory data of electronic device into the storage device upon the condition that the memory leak test is complete.

16. The non-transitory storage medium according to claim 11, wherein the medium is selected from the group consisting of a hard disk drive, a compact disc, a digital video disc, and a tape drive.

* * * * *